(12) United States Patent
Breuer et al.

(10) Patent No.: US 9,198,063 B2
(45) Date of Patent: Nov. 24, 2015

(54) METHOD OF DETECTING A JAMMING TRANSMITTER AFFECTING A COMMUNICATION USER EQUIPMENT, USER EQUIPMENT AND EVALUATION UNIT WITH INTERFACES TO THE USER EQUIPMENT

(75) Inventors: Volker Breuer, Botzow (DE); Bernd Rohl, Berlin (DE)

(73) Assignee: GEMALTO M2M GmbH, Munich (DE)

( * ) Notice: Subject to any disclaimer, the term of this patent is extended or adjusted under 35 U.S.C. 154(b) by 331 days.

(21) Appl. No.: 13/883,098

(22) PCT Filed: Nov. 16, 2011

(86) PCT No.: PCT/EP2011/070282
§ 371 (c)(1),
(2), (4) Date: May 2, 2013

(87) PCT Pub. No.: WO2012/066052
PCT Pub. Date: May 24, 2012

(65) Prior Publication Data
US 2013/0215786 A1   Aug. 22, 2013

(30) Foreign Application Priority Data
Nov. 16, 2010   (EP) ..................................... 10191430

(51) Int. Cl.
*H04W 24/04* (2009.01)
*H04B 1/7097* (2011.01)
(Continued)

(52) U.S. Cl.
CPC ............. *H04W 24/04* (2013.01); *H04B 1/7097* (2013.01); *H04B 1/7103* (2013.01); *H04K 3/22* (2013.01); *H04K 2203/16* (2013.01)

(58) Field of Classification Search
None
See application file for complete search history.

(56) References Cited

U.S. PATENT DOCUMENTS 6,229,998 B1 * 5/2001 Hamdy ................ H04B 1/7102
375/346
8,565,439 B2 * 10/2013 Girard ................. B60R 25/2072
340/854.6

(Continued)

FOREIGN PATENT DOCUMENTS

CA   2 433 242 A1   1/2004
CN   1233141 A   10/1999

(Continued)

OTHER PUBLICATIONS

"Universal Mobile Telecommunication System (UMTS); Requirements for support of radio resource management (FDD) (3GPP TS 25.133 version 7.14.0 Release 7); ETSI TS 125 133;" ESTI Standard, European Telecommunications Standards Institute (ETSI), Sophia Antipolis Cedex, France; vol. 3-R4, No. V7.14.0; Mar. 1, 2009; paragraph [4.2.2.1] through paragraph [4.2.2.4]; paragraph [09.2] through paragraph [9.2.1].

*Primary Examiner* — Mounir Moutaouakil
(74) *Attorney, Agent, or Firm* — Ware, Fressola, Maguire & Barber LLP

(57) ABSTRACT

The invention relates to a method of detecting a jamming transmitter affecting a communication user equipment, wherein said communication user equipment (UE) and a number of base node stations (BNS) are components of a cellular code division multiple access (CDMA) based radio network (RN), wherein a communication signal unit (SU) is correlated with a pseudonoise spread code (SC) in a serving cell coverage area (CA) of a serving base node station (sBNS) and transmitted as a pseudonoise chip (CHI) in a multiple shared communication frequency channel spectrally located between an upper frequency and a lower frequency of a communication frequency band (FB I-XIX) and the pseudonoise spread code (SC) is received by the communication user equipment (UE) as a serving pseudonoise spread code (sSC) from said serving base node station (BNS) in a serving downlink channel (sCPICH).

16 Claims, 3 Drawing Sheets

(51) Int. Cl.
*H04B 1/7103* (2011.01)
*H04K 3/00* (2006.01)

(56) References Cited

U.S. PATENT DOCUMENTS

2007/0224963 A1* 9/2007 Moscovitz ............ H04K 3/222 455/296
2012/0170754 A1* 7/2012 Girard ................ B60R 25/2072 380/287

FOREIGN PATENT DOCUMENTS

| | | |
|---|---|---|
| CN | 100361409 C | 1/2008 |
| EP | 1 168 689 A1 | 1/2002 |
| JP | 2000508496 A | 7/2000 |
| JP | 2004172953 A | 6/2004 |
| JP | 2009278536 A | 11/2009 |
| JP | 2010041679 A | 2/2010 |
| WO | 00/62437 A1 | 10/2000 |
| WO | 2007/019814 A1 | 2/2007 |

* cited by examiner

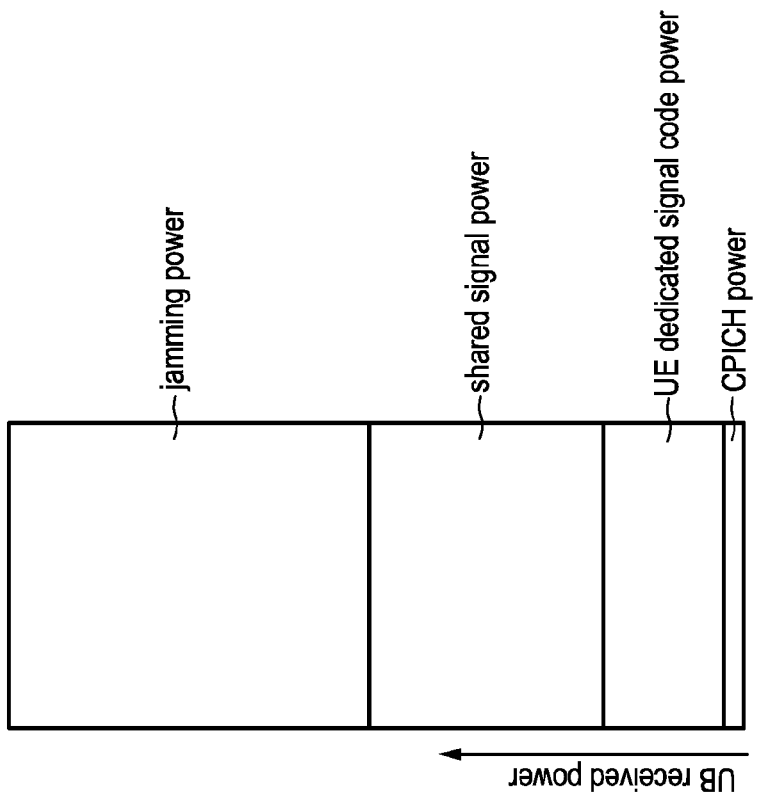
FIG. 2A
FIG. 2B
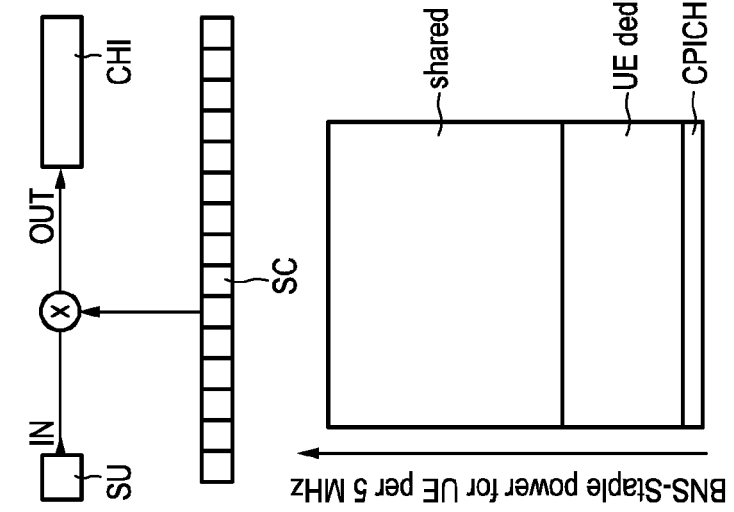
FIG. 2C

US 9,198,063 B2

METHOD OF DETECTING A JAMMING TRANSMITTER AFFECTING A COMMUNICATION USER EQUIPMENT, USER EQUIPMENT AND EVALUATION UNIT WITH INTERFACES TO THE USER EQUIPMENT

CROSS REFERENCE TO RELATED APPLICATIONS

This application is the U.S. National Stage of International Application Number PCT/EP2011/070282 filed on Nov. 16, 2011 which was published in English on May 24, 2012 under International Publication Number WO 2012/066052 and claims priority under 35 USC §119 to European Patent Application No. 10191430.7 filed on Nov. 16, 2010, which applications are hereby incorporated by reference in their entirety.

TECHNICAL FIELD

The present invention relates to a method of detecting a jamming transmitter effecting a communication user equipment. The present invention also relates to a user equipment configured to execute such a method and an evaluation unit with interfaces to the user equipment and with an application configured to execute such a method.

BACKGROUND OF THE INVENTION

Contemporary cellular radio networks are known since many years now meanwhile based on different technologies. The broadest coverage still is held by the global system for mobile communications according to the so called GSM standard. A user equipment in such cellular network can move freely and may be handled over to various cells of the GSM networks as for instance described in GSM standard specification 3GPP ETSI TS 51.010 or the like.

Contemporary radio networks are based on a cellular code division multiple access (CDMA) as for instance realized in the universal mobile telecommunication system (UMTS). The latter is increasingly important for security applications like camera systems or the like.

Generally, a user equipment in radio networks can be subject of being affected by a jamming transmitter—jamming in this context generally is performed by an instrument preventing a user equipment from receiving signals from its base station. In use the jammer effectively disables cellular phones mostly by broad frequency interference with communication frequencies of the user equipment at high power level. Whereas some jammer applications are meant to be legal for instances in places where phone call is to be suppressed due to silence conditions. Other jammers are applied during misuse for instances to interrupt security applications of user equipment or the like. Jammers are available for jamming GSM and also UMTS frequencies. However, jamming detecting and preventing solutions are known up to date basically only against GSM jammers. In this regard, it should be recognized that primary aim of an anti-jamming solution is to undoubtfully detect a jamming attack rather than preventing the same.

An anti-jamming solution is known from WO 2007/019814 which however is restricted to the GSM standard. Therein a method for detecting a jamming transmitter affecting a communication terminal is described wherein receipt radio channel signal levels are evaluated at periodic intervals on a signalling channel. In the case that the communication terminal detects a radio channel signal level that exceeds a predefined threshold value in the signalling channel but is nevertheless unable to decode a message content of a message, then this state is interpreted as an interference state and an alarm signal is emitted. The problem related with this GMS anti-jamming solution is its fundament on a predefined threshold value in the signalling channel and the receipt of a message content. These features are somewhat specific for the GMS technology, however, less suited in the UMTS technology. More specifically it turns out that an anti jamming solution in the frame of a cellular code division multiple access based radio network is much more demanding. The state of dealing with disturbances in a communication frequency band of a user equipment is more or less a usual state of operation for a user equipment within a cellular code division multiple access based radio network. In particular, intracell and intercell interferences are generally accepted in a CDMA based radio network as long as a signal can be decoded. Thus, the state of operation naturally is permanently disturbed due to the CDMA based technology. A discrimination of a severe jamming action among these natural disturbances is still a problem to be solved.

The specific reason is as follows. A communication user equipment (UE) and a number of base node stations (BNS) are the basic components of a CDMA based radio network. The radio network (RN) may work in either a frequency division duplex (FDD) or also a time division duplex (TDD) mode. Once a communication link in a serving cell coverage area is provided between the communication user equipment and a serving base node station (sBNS) a communication signal unit (SU) is correlated with a pseudonoise spread code (SC) in a serving cell coverage area (CA) of a serving base node station and transmitted as a pseudonoise chip (CHI) in a multiple shared communication frequency channel. Thus, interferences of multiple base node stations and user equipments in the communication frequency channel are spectrally located between an upper frequency and a lower frequency of a communication frequency band. Consequently, a broad band "jamming like" interference in the multiple shared communication frequency channel can not be considered as an extraordinary event but is on the contrary part of the usual state of operation. Such situation may also occur each time the number of users changes in said frequency band. The similar situation may also occur when a user equipment has a comparatively large or a comparatively small distance to a base node station. Also a similar situation may occur when a user equipment is in the reach of two base node stations in particular vice versa when two user equipments belong to the same or neighbouring cells of the CDMA based radio network. In conclusion, an anti-jamming solution to be successfully implemented in a CDMA based radio network technology is more sophisticating.

In particular, as compared to the above mentioned GSM solution of WO 2007/019814 a predefined threshold value for a signal level of a specific signalizing channel for a user equipment per se cannot be defined. Either the channel and/or the signal level is continuously changing depending on the surroundings of the network. Also, a message content as such can not be received unless a pseudonoise spread code is received by the communication user equipment. Consequently, without pseudonoise spread code neither transmission nor a content of a message is possible unless—the pseudonoise spread code is known to the user equipment.

SUMMARY OF THE INVENTION

This is where the invention comes in. The object of which is to provide an effective and reliable method and apparatus for detecting a jamming transmitter affecting a communication user equipment wherein the communication user equipment and a number of base node stations are components of a cellular code division multiple access based radio network like for instance frequency division duplex or time division duplex mode radio network. It is another object of the invention to provide such method and apparatus with a more elaborated anti-jamming concept allowing also detection of a jamming transmitter on a broad frequency range. In particular, it is a further object of the invention to provide a method and apparatus which allows for a warning against a jamming transmitter, i.e. not only detecting the instant situation of a jamming action but also foreseeing the approach of such a situation. The solution to the latter object is of high interest as the solution would naturally allow the method and apparatus to react in due time for instance by sending an alarm before the jamming action interrupts any communication of the user equipment.

As regards the method, the object is achieved by the method of the invention as claimed in claim 1. The object is also achieved by a developed configuration of the method as claimed in claim 2.

The method and developed configuration thereof as outlined above may be implemented by digital circuits of any preferred kind, whereby the advantages associated with the digital circuits may be obtained. A single processor or other unit may fulfil the functions of several means recited in the claims—this in particular holds for a user equipment according to the concept of the invention. As regards the apparatus, the object is achieved by particular preferred development of the user equipment as claimed in claim 15.

In particular, the concept of the invention also leads to a evaluation unit with interfaces to the user equipment and with an application configured to execute the method of the invention as defined in claim 16.

The instant invention starts from the consideration that the user equipment per se and without further measures cannot distinguish between a normal mode frequency disturbance and a jamming frequency disturbance—in the CDMA based radio network a user equipment is obliged to change a pseudonoise spread code, once a frequency disturbance becomes effective rather than sticking to one and the same pseudonoise spread code. This consideration leads the invention to the conclusion that once a jamming action becomes effective the user equipment will loose the pseudonoise spread code, which is essential for transmitting and transceiving messages.

In cellular CDMA based radio networks the pseudonoise spread code is received by the communication user equipment from a base node station in a downlink channel also denoted as common pilot channel (CPICH). The CPICH channel is a downlink channel broadcast by a node B with constant power and of a known bit sequence, here denoted as pseudonoise spread code. Its power is usually between 5% and 15% of the total node B transmit power. A common CPICH power is 10% of the typical total transmit power of 43 dBm. The CPICH channel thus is used by the user equipment for a first complete identification of a primary scrambling code used for scrambling a signal unit to be transmitted or received from the node B. A contemporary CPICH is e.g. transmitted using a spreading code 0 with the spreading factor of 256. The CPICH contains 20 bits of data, which are either all zeros or can be employed as a pattern of alternating ones and zeros. Once the scrambling code for a CPICH is known, the channel can be used for measurements of signal quality, usually comprising a set of cell selection criteria power parameters like RSCP and Ec/Io. There are most properly described in 3GPP TS25.133. Definitions and abbreviations or the like are known from 3GPP TS25.215. In particular, in chapter 4.2.2.1 of TS 25.133 an "out of coverage"-situation is defined using the cell criteria for power parameters as defined in the instant claims.

The first selection criteria power parameter is a band and/or channel biased ratio parameter, namely the Ec/Io-ratio (CPICH_Ec/Io) formed the received energy per pseudonoise chip (CHI) in the serving downlink channel (sCPICH) divided by the total received power spectral density at the communication user equipment antenna connector.

A further band and/or channel biased absolute parameter is specifically the received signal code power (CPICH RSCP) in the serving downlink channel for the pseudonoise spread code at the communication user equipment antenna connector.

In the case if the user equipment has evaluated for a consecutive number of cycles, that the serving cell does not fulfil the cell selection criterion, e.g. in form of Ec/Io and RSCP conditions the user equipment shall initiate the measurements for all neighbouring cells. In the case such measurements also fail to fulfil the cell selection criterions finally after a certain period of time the user equipment is considered to be out of service area.

Based on these considerations, the instant invention has realized that for an effective jamming detection it is further necessary to measure an unbiased received wide band power within the bandwidth of the communication user equipment receiver at the communication user equipment antenna connector.

Based on the above mentioned three power parameters, the concept of the invention proposes to verify three conditions which are sufficient to reliably detect a jamming transmitter action affecting the communication user equipment. The main concept proposed by the invention is to verify the conditions (a), (b), (c) as defined in claims 1 and 2. In particular, the basis is to verify that the biased parameters are not detectable, whereas the unbiased parameter has increased. The main concept proposed by the invention is to provide a concept of relative measurement, wherein the set of cell selection criteria power parameters in the communication link are measured at a first earlier time and at a second later time. This concept relies on the idea that an absolute measurement of power parameters or predefined threshold values are of negligible significance in a CDMA based radio network. Instead relative conditions like the comparison of a situation at a first earlier time and a second later time is important according to the invention.

Additionally, a further key concluding condition of the concept of the invention is given by verifying that the increased value of the unbiased parameter exceeds a basic noise floor by more than a threshold amount. Essentially, the threshold amount is not fixed or predefined but of adjustable magnitude sufficient for affirmation of a receivable pseudonoise spread code.

The invention has realized, that in the case an unbiased received wide band power exceeds a basic noise floor according to the standard a pseudonoise spread code should by receivable. Thus, e.g. the Ec/Io ratio or the received signal code power in the CPICH should be detectable. Therefore, once the conditions (a), (b) and (c) are all fulfilled, the only possibility remains that a jamming transmitter is affecting the communication user equipment. In particular, the concept of the invention relies on the relative situation between a first earlier and a second later time. The state of loss of the serving base node station at the second later time although the unbiased received wideband power has increased is a relative criterion comparing the situation to a first earlier time, thus adapted to the CDMA based technology.

The concept of the invention thus directs away from absolute measures or predefined threshold values. As compared to common place measures, a varieties of advantages are achieved by the concept proposed by the invention adapted to a CDMA based radio network. In particular, the concept also allows for further developments of the adjustable magnitude of the threshold amount for affirmation of a receivable pseudonoise spread code. Thus, the concept is adaptable to a variety of types of scramblers and scrambling codes. The type of scrambler and type of scrambling codes may vary depending on the specific type of cellular CDMA based radio network. However, once the scrambling code for a CPICH is known, the adjustable magnitude can be provided as for instance the threshold amount of a spread code gain value, which is based on a spreading factor of 256 and thus results in a spread code gain value of 24 dB.

Also the concept of the invention has the advantage that it is extendable to a broad frequency range. Also the concept can be used for a warning concept, which indicates the approach of a jamming transmitter.

These and other developed configurations of the invention are further outlined in the dependent claims. Thereby, the mentioned advantages of the proposed concept are even more improved.

In particular the set of at least one base node station is an active set of base node stations. The set of cells whose signals are used during a soft handoff in the standard is referred to as the active set. If a so called search finger finds a sufficiently strong signal in terms of high Ec/Io or RSCP from a new cell, this cell is added to the active set. Thus, the cells of the active set are checked more frequently than the rest. Thus, a handoff with a neighbouring cell within the active set is more likely. In the preferred embodiment, the active set comprises at least the serving base node station and/or a base node station with a strongest Ec/Io ratio and/or strongest RSCP. Thus, advantageously in a further prepared development the method of detecting can be made even more reliable by further verifying the conditions of the concept with regard to the strongest cell.

In a further preferred embodiment, the further condition that the bias parameters are not detectable at the second later time—as referred to as (a), (aa), (aaa) or (aaaa) conditions in claims 1 and 7 to 9 can be extended for any of the at least one downlink channels in the communication frequency channel. I.e. the concept can be extended within the whole 5 MHz frequency channel and also to a frequency band or number of all frequencies bands. In particular, also all frequency bands of the UMTS communication frequency bands can be implemented. In particular, also the communication user equipment can be part of a cellular global system of mobile communication, thus may rely on a combination of UMTS and GMS anti-jamming measures. Here the embodiments of WO 2007/019814 incorporated by reference for GSM-anti-jamming measures in this application.

In a particular preferred developed configuration, the concept of the invention may also comprise verifying a further condition for warning a jamming transmitter affecting a communication user equipment. These and further preferred developments are outlined in the method claims 12 to 15. Basically, in the so called (d)-condition in the claims the biased parameters are still detectable at the second later time, but each is significantly decreased. Thus, the so called (d)-condition is verified before verifying the so called (a)-condition of the concept of the invention. For instance, this applies to a case where the pseudonoise spread code is still detectable at the second later time but the Ec/Io ratio and the receipt signal code power RSCP are each decreased by more than 90% compared to the first earlier time. The development provides an effective concept for warning of a jamming transmitter once the conditions (d), (b) and (c) are fulfilled. As a result, the concept of the development allows to submit a message warning or indicating that a jamming transmitter is affecting the communication user equipment. In particular, a warning level can be made dependent on the amount of decrease of the bias ratio parameters. Also, the warning level can be made dependent on the magnitude of a threshold amount. Also the warning level can be made dependent on the exceeding amount of wideband power over noise floor. For instance the larger the decrease of biased parameters and the larger the increase of unbiased parameters at the second later time is compared to the first earlier time, than the higher the warning level shall be. Also the warning level should increase with increasing threshold amount.

In a particular preferred embodiment in case of a jamming action a warning or alarm message can be present in the user equipment itself. Preferably, the warning or alarm message can be also provided remotely from the user equipment; for instance by an evaluation unit which interfaces to the user equipment. Such evaluation unit can provide an application configured to execute the concept of the invention as described above.

For instance, the evaluation unit can be an evaluation program starting in a memory. In particular, the evaluation unit is part of an application and alarm signal estimated by the application. For instance, the alarm signal can be transmitted via an antenna, which is spaced apart from the user equipment and has means of connection via the cellular radio network. In particular, a computer or the like can be connected to the cellular radio network and processes the transmission of alarm signals.

A particular preferred concept of such remote activation of an alarm message is best described in the embodiments of WO 2007/019814 in principle which is incorporated by reference for this purpose in this application.

For a more complete understanding of the invention, the invention will now be described in detail with reference to the accompanying drawing. The detailed description will illustrate and describe what is considered as a preferred embodiment of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does exclude a plurality.

BRIEF DESCRIPTION OF THE DRAWINGS

FIG. 2A is a graphic illustrating the correlation of a pseudonoise spread code SC with a communication signal unit SU to provide a pseudonoise chip CHI in a multiple shared communication frequency channel;

FIG. 2B illustratively symbolizes a base node station staple power for a user equipment in a 5 MHz frequency band, i.e. representing the CDMA code staple method of the radio network of FIG. 1;

FIG. 2C illustrates the same situation as shown in FIG. 2B, however, including also a jamming power on top of the base node station staple power of FIG. 2B measured by the user equipment in a 5 MHz frequency band;

DETAILED DESCRIPTION

Figure 1:
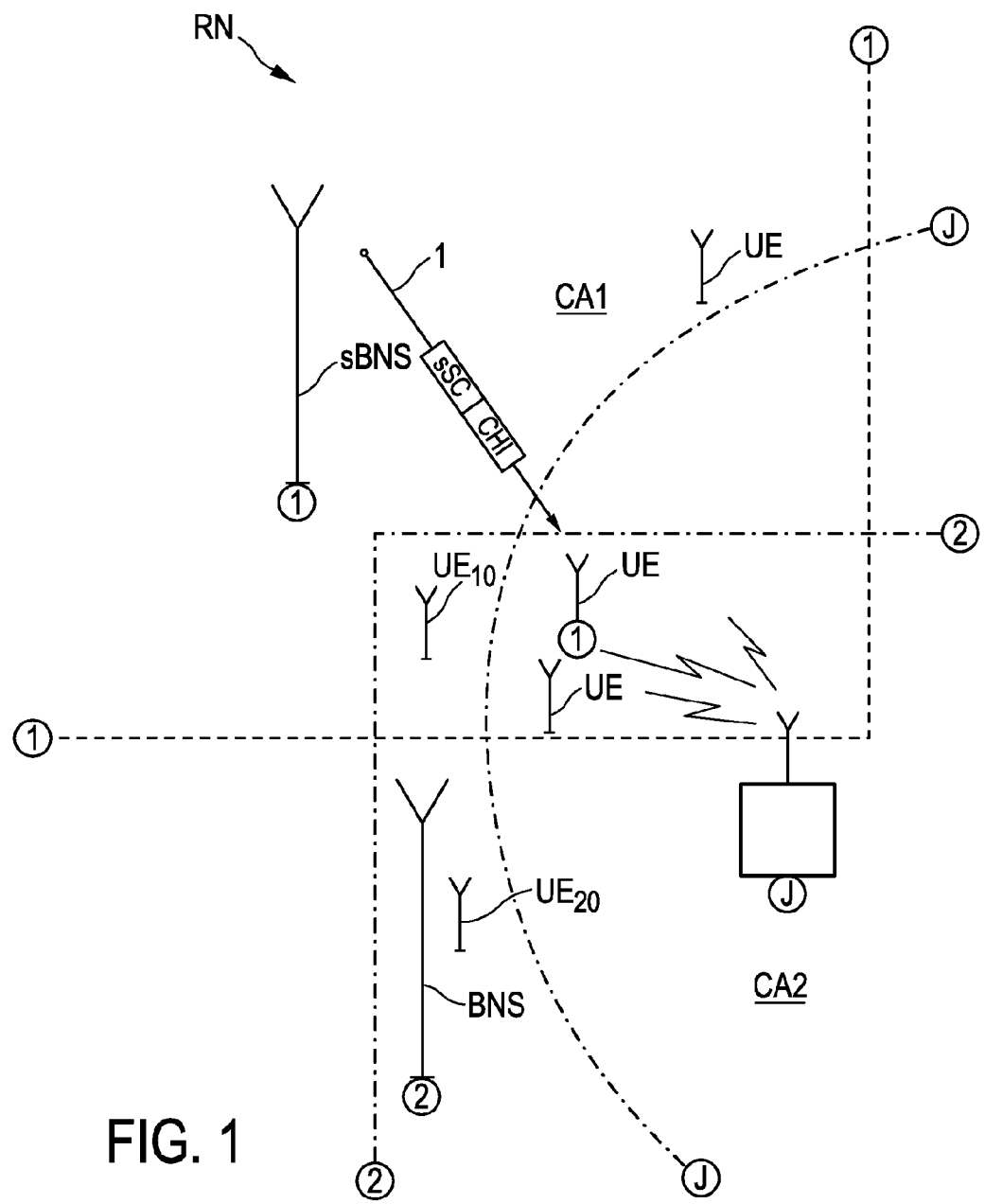
FIG. 1 shows a simplified symbolic graphic of a structure of a CDMA based radio network.

FIG. 1 shows in principle a cellular code division multiple access (CDMA) based radio network RN. The radio network RN allows for several transmitters—here referred to as a user equipment UE—to send information simultaneously over a single communication channel. This allows several user equipments UE to share a bandwidth of different frequencies. The CDMA based network can employ a spread spectrum technology and a special coding scheme—for instance a frequency division duplex FDD or time division duplex TDD mode can allow multiple users to be multiplexed over the same physical channel. The spread spectrum signalling has a much higher data bandwidth than the data being communicated. The CDMA based radio network RN provides a set of at least one base node station—here for instance the serving base node station sBNS and the further base node station BNS, which are within reach of the user equipment UE. For instance a communication link 1 in a serving cell #1 coverage area CA1 of the sBNS#1 is provided between the communication user equipment #1 and the assigned serving base node station sBNS#1. As the user equipment UE#1 is also in the cell coverage area CA2 of the base node station BNS#2, the base node station BNS#2 and the serving base node station sBNS#1 form an active set of base node stations, which are both in reach of the user equipment UE#1. In the present embodiment the sBNS#1 has the strongest communication link 1.

The communication link 1 is adapted for transmitting a signal comprising multiple communication signal units SU between the communication user equipment UE#1 and the serving base node station sBNS#1. As exemplified in FIG. 2A the communication signal unit SU forms the input of a scrambling code operation, wherein the signal unit SU is correlated with a pseudonoise spread code sSC in the serving cell coverage area CA1 of the serving base node station sBNS#1. The output signal of the scrambling code operation is a so called pseudonoise chip CHI formed by the scrambling encryption manipulating the original signal unit SU by means of the serving scrambling code sSC. This can be performed either by an additive or multiplicative scrambling operation as in principle known in the art.

As a result, the pseudonoise chip CHI is transmitted in a multiple shared communication frequency channel as indicated in the communication link 1 of FIG. 1 and can be transmitted or received by the user equipment UE#1 only when the serving pseudonoise spread code sSC is known by the user equipment UE#1. Once, the scrambling code SC, i.e. the pseudonoise spread code is known, a signal unit can be received or transmitted by the user equipment UE#1.

The pseudonoise spread code SC is received by the communication user equipment UE#1 as a serving pseudonoise spread code sSC as shown in FIG. 1 in a so called serving down link channel sCPICH. The CPICH contains 20 bits of data, which are either all zeros or in the case that space time transmit diversity is employed is a pattern of alternating ones and zeros for transmissions on the sBNS second antenna. The first antenna of a base node station always transmits all zeros for a CPICH. The CPICH downlink channel has a constant power and is of a known bit sequence. Its power is usually between 5% and 15% of the total BNS transmit power. A common CPICH power is of 10% of the typical total transmit power of 43 dBm. The CPICH can be used for measurements of signal quality.

In the instant embodiment, a jammer affects the user equipment UE#1 by interfering with the multiple shared communication frequency channel as located in a communication frequency band. Frequency bands FBI to FBIXX are known, each having a bandwidth of approximately 60 MHz. Each frequency band comprises several communication frequency channels, each having a bandwidth of 5 MHz. For each frequency channel, therefore the noise floor of 110 dBm can be defined based on a relative noise of 174 dBm/Hz.

As shown in FIG. 2B, a staple power for an out of jamming region user equipment UE#10 is a piled up staple with a rather small amount of CPICH power, a larger amount of signal code power dedicated to the user equipment and a main portion of shared signal power. The latter is used by several user equipments in the same 5 MHz bandwidth of the communication frequency channel. Nevertheless, information can be retrieved for each user equipment according to the pseudonoise spread code provided by the serving base node station and also the further base node station to each of the user equipments.

Once the number of user equipments changes in a coverage area CA1 of the service base node station 1 the shared signal power may vary rather often. However, as the serving pseudonoise spread code SSC is available for the user equipment UE#10 even upon variation of the shared signal power, user equipment UE#10 can uphold the communication link to the serving base node station sBNS#1. The reason for this is that even upon variation of the shared signal power nevertheless the CPICH power can be detected by the user equipment UE#10. The CPICH power normally is located not more than 24 dBm below the upper level of the staple power. Thus, due to the spread code gain value of instantly 24 dBm CPICH power and pseudonoise spread code SC can be detected by the user equipment UE#10 during normal operation.

In the case the distance between serving base node station sBNS#1 and user equipment UE#10 is diminished like for instance the distance between sBNS#1 and UE10 the cell selection criteria power parameters Ec/lo ratio—in the standard denoted as CPICH Ec/lo as well as the received signal code power CPICH RSCP will increase—thus overall the signal quality will increase. However, in the case the distance between UE#10 and sBNS#1 is enlarged—for instance by moving to UE#20—the biased parameter Ec/lo, i.e. ratio CPIHC Ec/lo and the received signal code power CPICH RSCP of the sBNS#1 will decrease but instead of those of the BNS#2 will increase. Thus, upon a situation, the soft-handover may occur between sBNS#1 and BNS#2 by moving UE#10 to UE#20. This situation is described for instance in 3GPP TS25.133.

Distinct from those normal operation interferences in the communication frequency channels is the situation shown in FIG. 1 due to the presence of a jammer J. The presence results in a user equipment UE#1 received staple power as shown in FIG. 2C. Additional to the CPICH power the dedicated signal code and the shared signal power a large pile of jamming power on top of the staple power of FIG. 2B is detected by UE#1. As can be easily already seen from FIG. 2C, the CPICH power therefore is not anymore in the spread code gain and consequently cannot be detected anymore. This situation is to be distinguished from the out of range situation as described in TS25.133 chapter 4.2.2.1. Namely, in the presently described situation of FIG. 1 and FIG. 2C the biased parameters are not detectable whereas the unbiased parameters have increased. The increase is due to the jamming power of jammer J. In the "out of service area" situation the unbiased parameters decrease as the biased parameters also decrease.

Consequently, according to the concept of the invention this situation can be used to provide an effective concept of detecting a jamming transmitter affecting the user equipment UE#1 when also an unbiased received wideband power within the bandwidth of the communication user equipment receiver at the communication user equipment UE#1 antenna connector is measured. Upon verifying the condition that the biased parameters—namely the Ec/Io and RSCCI—are not detectable and the unbiased parameter has increased a first indication of a jamming transmitter is given. However, to consolidate this finding a third condition has to be met according to the concept of the invention.

Figure 3:
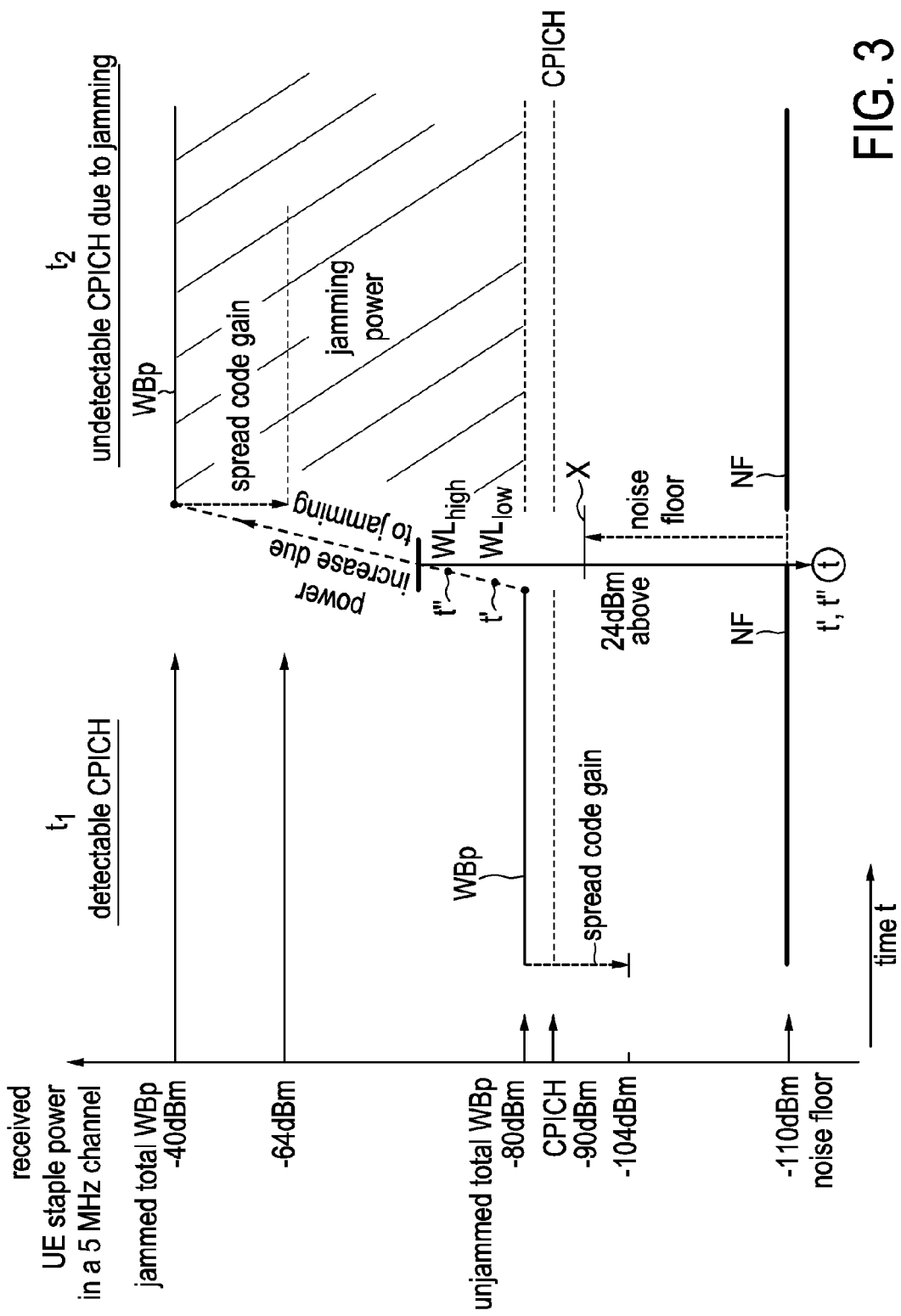
FIG. 3 illustrates more quantitatively an exemplifying situation showing the user equipment staple power at a first earlier time and the second later time with a detectable CPICH as compared to an undetectable CPICH due to jamming.

As best retrieved from FIG. 3, it is to be verified that the increased value of the unbiased parameter exceeds a basic noise floor by more than a predefined threshold amount X wherein the threshold amount X is of adjustable magnitude sufficient for affirmation of receivable pseudonoise spread code. In the present case, the pseudonoise spread code gain value has a magnitude of 24 dBm.

The left-hand side of FIG. 3 corresponds to an earlier time $t_1$ reflecting quantitatively the situation already shown in FIG. 2B. The right-hand side of FIG. 3 reflects a second later time corresponding quantitatively to the situation shown in FIG. 2C. Thus, FIG. 3 reflects e.g. moving from UE#10 to UE#1. The noise floor in FIG. 3 for both cases is located at 110 dBm corresponding to 174 dBm/Hz and a 5 MHz frequency band FBI—presently, the frequency band FBI has an uplink frequency between 1920-1980 MHz and the downlink frequency between 2110-2170 MHz, the duplex distance is 190 MHz and a channel width is 5 MHz.

At an earlier point of time $t_1$ the CPICH is still detectable and the CPICH power is located roughly at −90 dBm, thus 10 dBm below the total wideband power WBp shown for the unjammed situation at −80 dBm. Thus the CPICH channel power is within the spread code gain of −24 dBm. A CPICH power could be even detected down to −104 dBm.

The situation changes when the unbiased received wideband power WBp within the bandwidth of the communication user equipment receiver at the communication user equipment UE#1 antenna connector is increased due to the jamming power of the jammer J. This situation is shown at a later time $t_2$, wherein the CPICH is no more detectable due to jamming. As outlined already, the biggest received wideband power WBp at the second later time $t_2$ compared to the first earlier time $t_1$ has increased as shown by the dashed arrow between the left-hand side and the right-hand side of FIG. 3. Thus, the condition (b) of the claims and as shown above is positively verified. Furthermore, the increased value of the unbiased received wideband power WBp exceeds a basic noise floor NF by more than the threshold X, namely by more than the spread code gain value of 24 dBm. Thus the condition (c) of the claims is met. On the other hand, neither an Ec/Io ratio nor a RSCP received signal code power can be detected as the CPICH power at −90 dBm is far below the wideband power minus the spread code gain—namely far below −64 dBm. Thus the condition (a) listed in the claims is also positively verified.

Consequently, the situation at later time $t_2$ is a jamming situation. Also FIG. 3 right-hand side shows that the approved condition (c) as mentioned above indeed is necessary. In the case the increased value of the unbiased received wideband power would be less than 24 dB over noise floor this could still result from an out of service area situation at time $t_1$ and time $t_2$.

In a further embodiment not shown here, a warning can be outputted by submitting an indicating jamming message from the user equipment UE#10 to an application and in particular still to any of the set of at least one base node station as long as the wideband power WBp is below the double slash on the dashed arrow in FIG. 3. In this case, it is to be assumed that the biased parameters—namely Ec/Io and RSCP—in the serving downlink channel sCPICH for the pseudonoise spread code is still detectable at a later time t between $t_1$ and $t_2$. But nevertheless each is significantly decreased, for instance decreased by more than 90% compared to the first earlier time $t_1$. In this case a warning level can be given depending on the exceeding amount of the wideband power over noise floor NF. For instance a low warning level $WL_{low}$ can be given at time t' and a high warning level $WL_{high}$ can be given at time t''. At later time wherein the wideband power WBp is beyond the double flash the CPICH power is no more within the spread code gain and jamming is interrupting the communication link of UE#1 to sBNS#1. In this case conditions (a), (b) and (c) are met and a jamming transmitter is affecting a communication user equipment UE#1. An indicating jamming message can be submitted from the user equipment UE#1 to an application and the application can further submit an alarm message. The alarm message can be conducted to other items of the network or controller stations.

The warning level can also be increased with the magnitude of the threshold amount X. For instance, a warning level can be predominantly high the lower the threshold amount is—in this case the spread code gain is rather low and jamming can interrupt a communication link more effectively than in the case where the threshold amount is high.

The invention relates to a method of detecting a jamming transmitter affecting a communication user equipment, wherein said communication user equipment (UE) and a number of base node stations (BNS) are components of a cellular code division multiple access (CDMA) based radio network (RN), wherein:
    a communication signal unit (SU) is correlated with a pseudonoise spread code (SC) in a serving cell coverage area (CA) of a serving base node station (sBNS) and transmitted as a pseudonoise chip (CHI) in a multiple shared communication frequency channel spectrally located between an upper frequency and a lower frequency of a communication frequency band (FB I-XIX) and
    the pseudonoise spread code (SC) is received by the communication user equipment (UE) as a serving pseudonoise spread code (sSC) from said serving base node station (BNS) in a serving downlink channel (sCPICH).

The invention claimed is:
1. A method of detecting a jamming transmitter affecting a communication user equipment, wherein
    said communication user equipment and a number of base node stations are components of a cellular code division multiple access based radio network, wherein:
    a communication signal unit is correlated with a pseudonoise spread code in a serving cell coverage area of a serving base node station and transmitted as a pseudonoise chip in a multiple shared communication frequency channel spectrally located between an upper frequency and a lower frequency of a communication frequency band and the pseudonoise spread code is received by the communication user equipment as a serving pseudonoise spread code from said serving base node station in a serving downlink channel comprising the steps of:

measuring a set of cell selection criteria power parameters in the communication link at a first earlier time and at a second later time, the power parameters comprising at least one of a band and channel biased ratio-parameter significant for the received power per chip relative to a total received power at the communication user equipment antenna connector, at least one of a band and channel biased absolute-parameter significant for the received signal power for the pseudonoise spread code at the communication user equipment antenna connector, and an unbiased received wide band power within the bandwidth of the communication user equipment receiver at the communication user equipment antenna connector; and verifying the conditions, that (a) the biased parameters are not detectable at the second later time, and (b) the unbiased parameter at the second later time compared to the first earlier time has increased, and (c) the increased value of the unbiased parameter exceeds a basic noise floor by more than a threshold amount, wherein the threshold amount is of adjustable magnitude sufficient for affirmation of a receivable pseudonoise spread code, and amounts to or exceeds a spread code gain value.

2. The method of detecting a jamming transmitter affecting a communication user equipment according to claim 1, wherein said communication user equipment and a number of base node stations are components of a cellular code division multiple access based radio network, in particular in a frequency division duplex or time division duplex mode, wherein a set of at least one base node stations from said number of base node stations are within reach of the user equipment, wherein a communication link in a serving cell coverage area is provided between the communication user equipment and at least an assigned serving base node station of said set of at least one base node stations, wherein said communication link being adapted for transmitting a signal comprising multiple communication signal units between the communication user equipment and at least the serving base node station, wherein a said communication signal unit is correlated with a pseudonoise spread code in the serving cell coverage area of the serving base node station and transmitted as a pseudonoise chip in a multiple shared communication frequency channel spectrally located between an upper frequency and a lower frequency of a communication frequency band and wherein the pseudonoise spread code is received by the communication user equipment as a serving pseudonoise spread code of at least one pseudonoise spread code from said set of at least one base node station in a serving downlink channel of at least one downlink channel comprising the steps of:

measuring a set of power parameters in the communication link at a first earlier time and at a second later time, the power parameters comprising at least one of:

(i) the EC/lo-ratio formed by the received energy per pseudonoise chip in the serving downlink channel divided by the total received power spectral density at the communication user equipment antenna connector; and (ii) the received signal code power in the serving downlink channel for the pseudonoise spread code at the communication user equipment antenna connector;

(iii) and additionally the unbiased received wide band power within the bandwidth of the communication user equipment receiver at the communication user equipment antenna connector; and verifying the conditions, that (a) the EC/lo-ratio of the received energy per pseudonoise chip in the serving downlink channel divided by the total received power spectral density and the received signal code power in the serving downlink channel for the pseudonoise spread code are not detectable at the second later time, (b) the unbiased received wide band power at the second later time compared to the first earlier time has increased, and (c) the increased value of the unbiased received wide band power exceeds a basic noise floor by more than a threshold amount.

3. The method according to claim 1, comprising a threshold amount is of adjustable magnitude sufficient for affirmation of a receivable pseudonoise spread code.

4. The method according to claim 1, comprising wherein the spread code gain value is 24 dB.

5. The method according to claim 2, wherein said set of at least one base node stations is an active set of base node stations comprising at least one of the serving base node station and a base node station with an at least one of strongest EC/lo-ratio and strongest in the active set.

6. The method according to claim 2, comprising further verifying the conditions (a) that the downlink channel with at least one of strongest EC/lo-ratio and strongest is not detectable at the second later time; and (b) the unbiased received wide band power at the second later time compared to the first earlier time has increased with regard to said downlink channel with strongest EC/lo-ratio and strongest.

7. The method according to claim 2, comprising verifying the further condition, that (aa) the EC/lo-ratio and the received signal code power is not detectable at the second later time for any of the at least one downlink channels in the communication frequency channel.

8. The method according to claim 2, comprising verifying the further condition, that (aaa) the EC/lo-ratio and the received signal code power is not detectable at the second later time for any of the at least one downlink channels in the communication frequency band.

9. The method according to claim 2, comprising verifying the conditions, that (aaaa) the EC/lo-ratio and the received signal code power is not detectable at the second later time for any of the at least one downlink channels in all the available communication frequency bands.

10. The method according to claim 9, wherein the available communication frequency bands comprise all UMTS communication frequency bands.

11. The method according to claim 2, comprising verifying further, that
- (d) the EC/Io-ratio and the received signal code power in the serving downlink channel for the pseudonoise spread code is still detectable at the second later time but each significantly decreased, in particular each decreased by more than 90%, compared to the first earlier time, in particular for any of the at least one downlink channels in the communication frequency channel.

12. The method according to claim 2, wherein
in the case that the (a)-conditions and (b)- and (c)-conditions are met indicating that a jamming transmitter is affecting a communication user equipment, in particular submitting an indicating jamming message from the user equipment to an application.

13. The method according to claim 11, wherein
in the case that the (d)-condition and (b)- and (c)-conditions are met, warning that a jamming transmitter is affecting the communication user equipment in particular submitting an indicating jamming message from the user equipment to at least one of an application and any of the set of at least one base node stations.

14. The method according to claim 13, comprising
indicating a warning level for indicating the amount of impact caused by a jamming transmitter affecting a communication user equipment wherein the warning level is depending on the exceeding amount of at least one of the wide band power over noise floor and the magnitude of the predefined threshold amount.

15. A user equipment configured to execute the method of detecting a jamming transmitter affecting the communication user equipment as claimed in claim 1, wherein
said communication user equipment and a number of base node stations are components of a cellular code division multiple access based radio network, in particular in a frequency division duplex or time division duplex mode, wherein
a set of at least one base node stations from said number of base node stations are within reach of the user equipment, wherein
a communication link in a serving cell coverage area can be provided between the communication user equipment and at least an assigned serving base node station of said set of at least one base node stations, wherein
said communication link being adapted for transmitting a signal comprising multiple communication signal units between the communication user equipment and at least the serving base node station, wherein
a said communication signal unit is correlated with a pseudonoise spread code in the serving cell coverage area of the serving base node station and transmitted as a pseudonoise chip in a multiple shared communication frequency channel spectrally located between an upper frequency and a lower frequency of a communication frequency band and wherein
the pseudonoise spread code is received by the communication user equipment as a serving pseudonoise spread code of at least one pseudonoise spread code from said set of at least one base node station in a serving downlink channel of at least one downlink channel comprising:
means for measuring a set of power parameters in the communication link at a first earlier time and at a second later time, the power parameters comprising at least one of:
- (iv) the EC/Io-ratio formed by the received energy per pseudonoise chip in the serving downlink channel divided by the total received power spectral density at the communication user equipment antenna connector; and/e-r
- (v) the received signal code power in the serving downlink channel for the pseudonoise spread code at the communication user equipment antenna connector;
- (vi) and additionally the unbiased received wide band power within the bandwidth of the communication user equipment receiver at the communication user equipment antenna connector; and means for verifying the conditions, that
- (a)—the EC/Io-ratio of the received energy per pseudonoise chip in the serving downlink channel divided by the total received power spectral density and
  the received signal code power in the serving downlink channel for the pseudonoise spread code
  are not detectable at the second later time, and
- (b) the unbiased received wide band power at the second later time compared to the first earlier time has increased and
- (c) the increased value of the unbiased received wide band power exceeds a basic noise floor by more than a threshold amount.

16. An evaluation unit with interfaces to the user equipment and with an application configured to execute the method as claimed in claim 1, and which is configured to
evaluate the set of power parameters in the communication link at a first earlier time and at a second later time,
verify the (a) and (b) and (c) conditions, and
indicating a warning that a jamming transmitter is affecting a communication user equipment.

* * * * *

UNITED STATES PATENT AND TRADEMARK OFFICE
CERTIFICATE OF CORRECTION

PATENT NO. : 9,198,063 B2
APPLICATION NO. : 13/883098
DATED : November 24, 2015
INVENTOR(S) : Volker Breuer et al.

Page 1 of 1

It is certified that error appears in the above-identified patent and that said Letters Patent is hereby corrected as shown below:

In the claims,
1) At column 13, line 16, claim 13, line 1, please remove "claim 11" and insert --claim 2-- therefore.

Signed and Sealed this
Twenty-first Day of June, 2016

Michelle K. Lee
*Director of the United States Patent and Trademark Office*